(12) United States Patent
Kimura et al.

(10) Patent No.: US 7,930,528 B2
(45) Date of Patent: Apr. 19, 2011

(54) METHOD FOR STATUS INDICATION OF ACTIVATING APPLICATION INCLUDING INDICATION OF OPERATING SYSTEM BOOTUP PROCESS WITH LIGHT EMITTING SECTION PRIOR TO APPLICATION ACTIVATION

(75) Inventors: Masatoshi Kimura, Kawasaki (JP);
Takahide Norinobu, Kawasaki (JP);
Hisashi Negishi, Kawasaki (JP);
Takashi Kogure, Kawasaki (JP);
Nobuyoshi Mizoo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1010 days.

(21) Appl. No.: 10/921,308

(22) Filed: Aug. 19, 2004

(65) Prior Publication Data
US 2005/0235294 A1  Oct. 20, 2005

(30) Foreign Application Priority Data
Apr. 19, 2004 (JP) ................. 2004-122440

(51) Int. Cl.
G06F 9/46 (2006.01)
G06F 15/177 (2006.01)
G06F 1/00 (2006.01)

(52) U.S. Cl. ............. 713/2; 713/1; 713/323; 718/100; 718/108

(58) Field of Classification Search ............ 718/1, 100, 718/108, 107, 101, 102, 103, 104, 105, 106; 345/156, 157, 158, 168, 172, 184
See application file for complete search history.

(56) References Cited

U.S. PATENT DOCUMENTS 6,657,548 B2 * 12/2003 Dai .................. 340/815.45
6,678,712 B1 * 1/2004 McLaren et al. ........... 718/100
7,002,554 B2 * 2/2006 Numano et al. ........... 345/172
7,162,629 B2 * 1/2007 Zimmer et al. ........... 713/100

(Continued)

FOREIGN PATENT DOCUMENTS
JP  07271562  * 10/1995
(Continued)

OTHER PUBLICATIONS

JPO, Office Action mailed Jan. 12, 2010 by Japan Patent Office in connection with JP patent application No. 2004-122440. English language translation provided.

*Primary Examiner* — Meng-Ai An
*Assistant Examiner* — Abdullah Al Kawsar
(74) *Attorney, Agent, or Firm* — Fujitsu Patent Center

(57) ABSTRACT

When a prescribed application such as a TV application, etc., is activated by using a general-purpose OS, an application activation device can inform a user of the fact that it is now in preparation for activation of the application, so as to avoid inducing the user to become uneasy during his or her waiting. The device includes an activation event input section (1) for inputting an activation event for the TV application in either of plural power supply states of a computer when the TV application is activated from either of a power off state, a hibernation state and a standby state of the computer, an activation event detection section (2) for detecting an input activation event, and an activation preparation state indicating section (3A) for indicating, during the time from when an activation event has been detected until when the TV application is activated, that the TV application is in preparation for being activated.

15 Claims, 6 Drawing Sheets

U.S. PATENT DOCUMENTS

| | | | |
|---|---|---|---|
| 7,308,340 B2 * | 12/2007 | Matsuoka et al. | 700/300 |
| 2001/0056509 A1 * | 12/2001 | Iwata | 710/20 |
| 2004/0222977 A1 * | 11/2004 | Bear et al. | 345/184 |
| 2004/0226020 A1 * | 11/2004 | Birmingham | 719/310 |

FOREIGN PATENT DOCUMENTS

| | | |
|---|---|---|
| JP | 07-319652 | 12/1995 |
| JP | 10-063487 A | 3/1998 |
| JP | 10063487 * | 3/1998 |
| JP | 11-143619 | 5/1999 |
| JP | 11-305882 | 11/1999 |
| JP | 2000-020285 A | 1/2000 |
| JP | 2001-216141 | 8/2001 |
| JP | 2001-333173 | 11/2001 |
| JP | 2003-256244 | 9/2003 |

\* cited by examiner

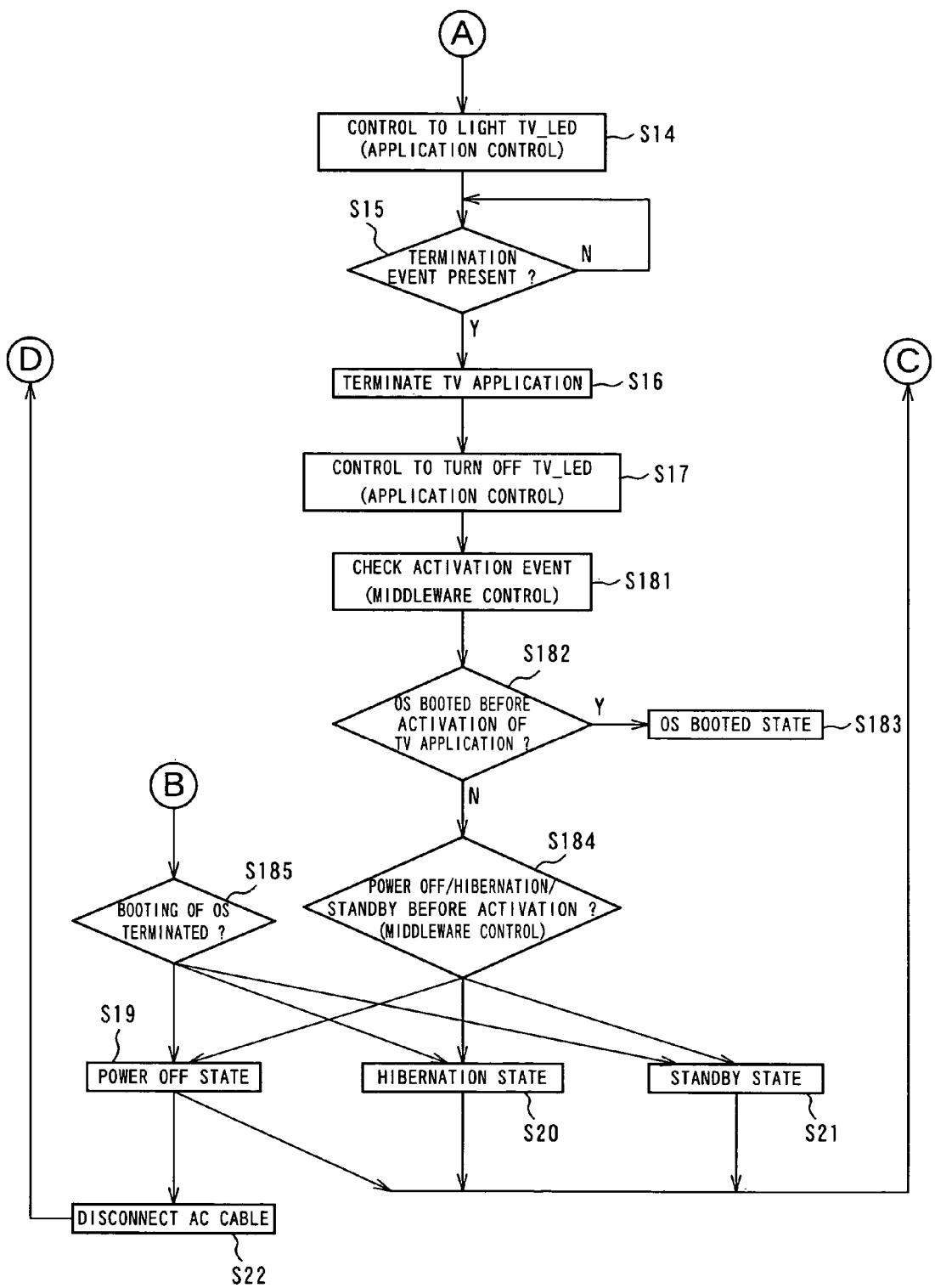

METHOD FOR STATUS INDICATION OF ACTIVATING APPLICATION INCLUDING INDICATION OF OPERATING SYSTEM BOOTUP PROCESS WITH LIGHT EMITTING SECTION PRIOR TO APPLICATION ACTIVATION

BACKGROUND OF THE INVENTION

1. Field of the Invention

The present invention relates to an information processing device, an application activation method, an application activation program, and a display unit for a computer, capable of activating prescribed applications used in the computer from either of plural power supply states of the computer including a power off state, a hibernation state or a standby state, for instance.

2. Description of the Related Art

In information processing devices such as personal computers (hereinafter referred to as PCs), etc., there has been known one equipped with an application activation device that is capable of activating, from among a plurality of available applications, only specified applications such as, for example, mailers, internet browsers, etc., from either of power supply states of a computer including a power off state, a hibernation state and a standby state, by one-touch operation.

Such an information processing device is provided, for example, with an application button for the activation of an application, so that the preparation for activation of the application is started at once by pressing the application button.

However, the application activation device as mentioned above requires the following procedure. That is, by a user pressing the application button, an operating system (hereinafter referred to as an OS) is first booted and the application is then launched or activated. Accordingly, the user has to wait for a considerable time from the time the application button is pressed until the time the application is executed. However, in any known devices as hitherto proposed, no indication is made during such a time so as to notify the user of the preparation for activation of the application being performed. Thus, the user might become uneasy as to whether the preparation for activation of the application is actually being carried out.

On the other hand, in the case of a specific application in the form of a television application (hereinafter referred to as a TV application) that enables television programs to be displayed on a computer screen, it is known that the above-mentioned activation preparation time is intended to be shortened to reduce the user's waiting time to a substantial extent by providing a special OS for booting only the TV application, separately from and in addition to another OS generally used with PCs for execution of many application programs. In this case, however, there is another problem that it becomes costly because of the provision of the additional OS dedicated for the TV application separately from the general OS.

SUMMARY OF THE INVENTION

Accordingly, the present invention has been made in view of the above-mentioned problems, and has for its object to provide an information processing device, an application activation method, an application activation program, and a display unit for a computer, in which when a prescribed application such as a TV application, etc., is activated by using a general-purpose OS in an information processing device such as a PC, the user can be informed of the fact that it is now in preparation for activation of the application, so as to avoid inducing the user to have uneasiness during his or her waiting.

In order to solve the above-mentioned problems, in one aspect of the present invention, there is provided an information processing device in which a prescribed application operates, the device comprising: an activation instruction input section that inputs an instruction for activation of the prescribed application; and an activation preparation state indicating section that indicates, during the time from when the activation instruction has been input until when the prescribed application is activated, that the prescribed application is in preparation for being activated.

Preferably, the information processing device of the present invention further comprises: an activation instruction information holding section that holds information on the input activation instruction; an operating system boot section that boots an operating system based on the activation instruction; and an application activation section that activates the prescribed application based on information held in the activation instruction information holding section after the operating system has been booted.

Preferably, the information processing device of the present invention further comprises: an interrupt instruction generation section that generates an interrupt instruction to an application under execution thereby to activate the prescribed application when an activation instruction is input by the activation instruction input section during execution of an application other than the prescribed application.

Preferably, in the information processing device of the present invention, the activation preparation state indicating section comprises a light emitting section provided on a display unit used in the information processing device.

Preferably, the activation instruction input section is provided with a start button for activation of the prescribed application or an instruction receiving section of a remote control device, and the activation instruction is generated by pressing of the start button or by the reception of an instruction from the remote control device.

Preferably, the information processing device of the present invention further comprises: a power supply state information holding section that holds the power supply state of the information processing device before activation of the prescribed application; and a power supply control section that shifts the power supply state of the information processing device to its state before activation of the prescribed application based on the power supply state of the information processing device held in the power supply state information holding section when the termination of execution of the prescribed application is instructed.

Preferably, in the information processing device of the present invention, the prescribed application is an application for displaying received broadcast pictures.

Preferably, the information processing device of the present invention further comprises: an execution state indicating section that indicates the activation preparation termination state of the prescribed application as an execution state thereof in distinction from the activation preparation state thereof after the preparation for activation of the prescribed application is terminated.

In another aspect of the present invention, there is provided an application activation method using an information processing device in which a prescribed application operates, the method comprising: an activation instruction detection step for detecting an instruction for activation of the prescribed application; and an activation preparation state indicating step for indicating, during the time from when an activation event has been detected in the activation event detection step until when the prescribed application is activated, that the prescribed application is in preparation for being activated.

Preferably, the application activation method of the present invention further comprises: an activation instruction information holding step for holding information on the activation instruction detected in the activation instruction detection step; an operating system boot step for booting an operating system based on the activation instruction detected in the activation instruction detection step; and an application activation step for activating the prescribed application based on instruction information held in the activation instruction information holding step after the operating system has been booted.

Preferably, the application activation method of the present invention further comprises: an interrupt instruction generation step for generating an interrupt instruction to an application under execution thereby to activate the prescribed application when an instruction for activation of the prescribed application is input during execution of an application other than the prescribed application.

Preferably, the application activation method of the present invention further comprises: a power supply state holding step for holding the power supply state of the information processing device before activation of the prescribed application; and a power supply state shift step for shifting the power supply state of the information processing device to its state before activation of the prescribed application based on the power supply state of the information processing device held in the power supply state information holding step when the termination of execution of the prescribed application is instructed.

Preferably, the application activation method of the present invention further comprises: an execution state indicating step for indicating the activation preparation termination state of the prescribed application as an execution state thereof in distinction from the activation preparation state thereof after the preparation for activation of the prescribed application is terminated.

Preferably, in the application activation method of the present invention, the activation preparation state indicating step displays a blinking indication of a light emitting section; the execution state indicating step displays a lighting indication of the light emitting section; and a turn-off step for turning off the light emitting section is provided between the activation preparation state indicating step and the execution state indicating step.

In a further aspect of the present invention, there is provided an application activation program for making a computer of an information processing device execute: an activation instruction detection step for detecting an instruction for activation of a prescribed application input to the computer; and an activation preparation state indicating step for indicating, during the time from when an activation instruction has been detected in the activation instruction detection step until when the prescribed application is activated, that the prescribed application is in preparation for being activated.

Preferably, in the application activation program of the present invention, the program makes the computer execute: an activation instruction information holding step for holding information on the activation instruction detected in the activation instruction detection step; an operating system boot step for booting an operating system based on the activation instruction detected in the activation instruction detection step; and an application activation step for activating the prescribed application based on instruction information held in the activation instruction information holding step after the operating system has been booted.

Preferably, in the application activation program of the present invention, the program makes the computer execute: an interrupt instruction generation step for generating an interrupt instruction to an application under execution thereby to activate the prescribed application when an instruction for activation of the prescribed application is input during execution of an application other than the prescribed application.

Preferably, in the application activation program of the present invention, the program makes the computer execute: a power supply state holding step for holding the power supply state of the computer before activation of the prescribed application; and a power supply state shift step for shifting the power supply state of the computer to its state before activation of the prescribed application based on the power supply state of the computer held in the power supply state information holding step when the termination of execution of the prescribed application is instructed.

Preferably, in the application activation program of the present invention, the program makes the computer execute: an execution state indicating step for indicating the activation preparation termination state of the prescribed application as an execution state thereof in distinction from the activation preparation state thereof after the preparation for activation of the prescribed application is terminated. Also, preferably, the activation preparation state indicating step displays a blinking indication of a light emitting section; the execution state indicating step displays a lighting indication of the light emitting section; and the program makes the computer execute a turn-off step for turning off the light emitting section between the activation preparation state indicating step and the execution state indicating step.

In a still further aspect of the present invention, there is provided a display unit for a computer, comprising: a button for activating a prescribed application that operates in the computer; and an indicator section that indicates, during the time from when the button has been pressed until when the prescribed application is activated, that the prescribed application is in preparation for being activated.

Preferably, in the information processing device according to the present invention, the power supply state is either of a power off state, a hibernation state and a standby state.

In addition, according to the present invention, there can be provided an application activation device for activating, from among a plurality of applications used in a computer, a prescribed application from either of a power off state, a hibernation state and a standby state of the computer, the device including: an activation event input section that inputs an activation event for the prescribed application in either of the power supply states of the computer; an activation event detection section that detects the activation event input by the activation event input section; and an activation preparation state indicating section that indicates, during the time from when an activation event has been detected by the activation event detection section until when the prescribed application is activated, that the prescribed application is in preparation for being activated.

Moreover, according to the present invention, there can be provided an application activation method for activating, from among a plurality of applications used in a computer, a prescribed application from either of a power off state, a hibernation state and a standby state of the computer, the method including: an activation event detection step for detecting an activation event for the prescribed application input in either of a power off state, a hibernation state and a standby state of the computer; and an activation preparation state indicating step for indicating, during the time from when an activation event has been detected in the activation event detection step until when the prescribed application is activated, that the prescribed application is in preparation for being activated.

Further, according to the present invention, there can be provided an application activation program for making a computer execute to activate, from among a plurality of applications used in a computer, a prescribed application from either of a power off state, a hibernation state and a standby state of the computer, the program including: an activation event detection step for detecting an activation event for the prescribed application input in either of a power off state, a hibernation state and a standby state of the computer; and an activation preparation state indicating step for indicating, during the time from when an activation event has been detected in the activation event detection step until when the prescribed application is activated, that the prescribed application is in preparation for being activated.

Furthermore, according to the present invention, there can be provided a display unit for a computer which is able to activate, from among a plurality of applications used in the computer, a prescribed application from either of a power off state, a hibernation state and a standby state of the computer, the display unit including: a button for activating the prescribed application; and a indicator section that indicates, during the time from when the button has been pressed until when the prescribed application is activated, that the prescribed application is in preparation for being activated.

Here, note that the above-mentioned application activation program can be stored in a computer readable medium. In this regard, the computer readable recording medium includes, in addition to a semiconductor memory such as a ROM, a RAM and the like, a portable storage medium such as a CD-ROM, a flexible disk, a DVD disk, a magneto-optical disk, an IC card or the like, or a database that holds therein computer programs, or another computer and its database.

As described in detail above, according to the present invention, when a prescribed application such as a TV application, etc., is activated by using a general-purpose OS in an information processing device such as a PC, the user can be informed of the fact that it is now in preparation for activation of the application, so as to avoid inducing the user to become uneasy during his or her waiting. In addition, it is not necessary to use two OSs, so the information processing device can be produced at low cost.

The above and other objects, features and advantages of the present invention will become more readily apparent to those skilled in the art from the following detailed description of preferred embodiments of the present invention taken in conjunction with the accompanying drawings.

BRIEF DESCRIPTION OF THE DRAWINGS

FIG. 7 is a flow chart showing the operation of the major parts of the information processing device according to the second embodiment of the present invention.

DESCRIPTION OF THE PREFERRED EMBODIMENTS

Hereinafter, preferred embodiments of the present invention will be described in detail while referring to the accompanying drawings.

Embodiment 1

Figure 1:
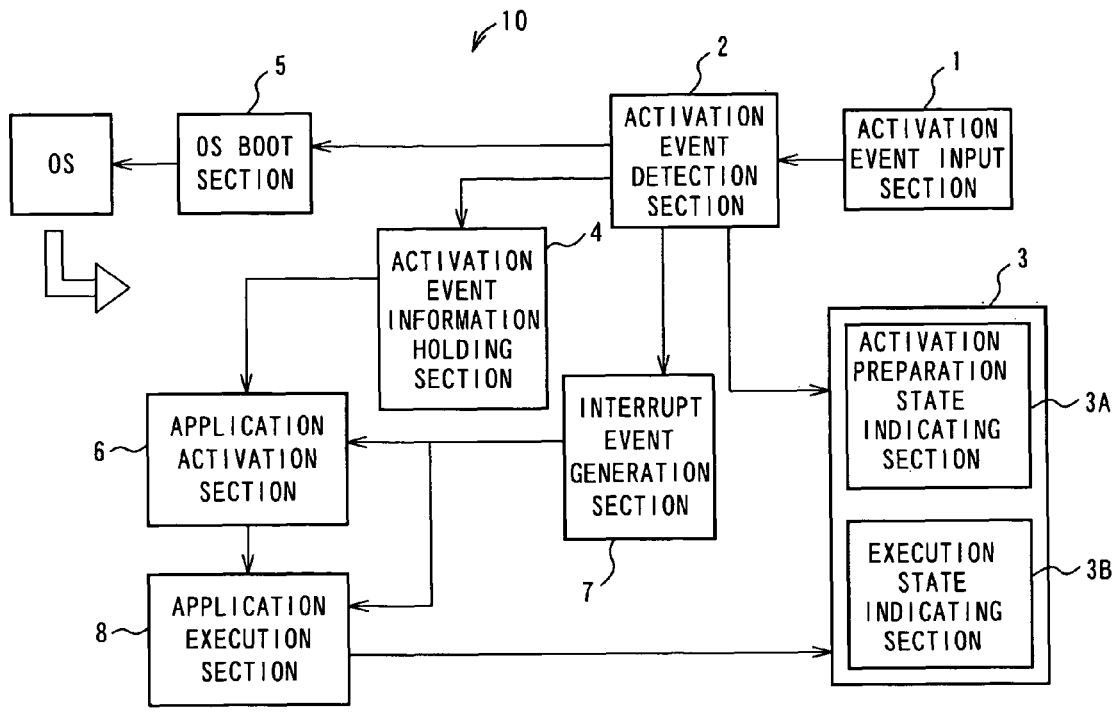
FIG. 1 is a functional block diagram of an information processing device according to a first embodiment of the present invention.
Figure 2:
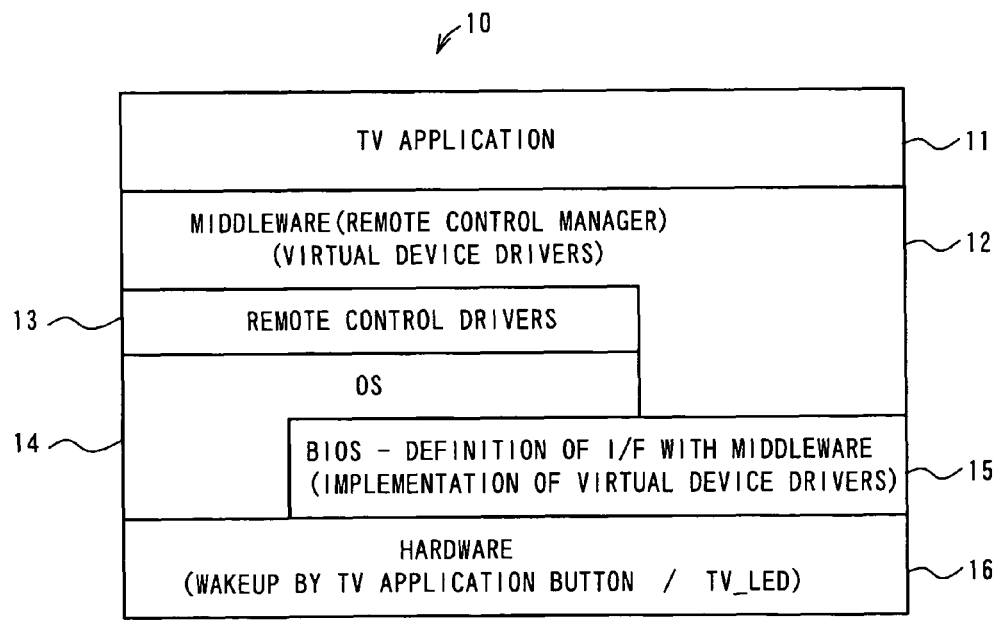
FIG. 2 is a hierarchical or layered configuration view showing a hierarchical structure that constitutes the same function as that of FIG. 1.
Figure 3:
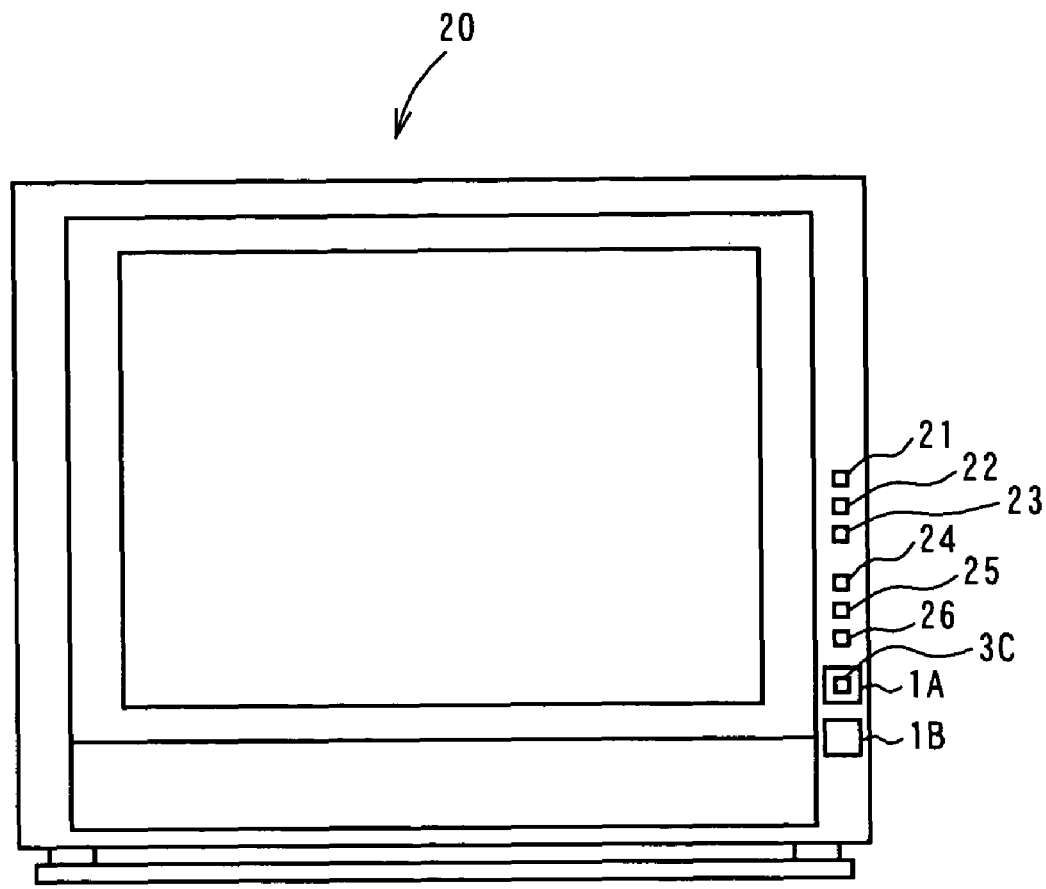
FIG. 3 is a front elevational view showing a display unit according to the first embodiment of the present invention.

FIG. 1 is a functional block diagram of an information processing device according to a first embodiment of the present invention. FIG. 2 is a hierarchical or layered configuration view that illustrates a hierarchical or layered structure constituting the same function as that of FIG. 1. FIG. 3 is a front elevational view of a display unit according to this embodiment. Here, note that the following explanation will be made with the assumption that an application activation device provided to the information processing device according to the present invention is a TV application activation device for activating a TV application that enables television pictures to be displayed on a display unit of a PC.

As shown in FIG. 1, the information processing device according to the first embodiment of the present invention is provided with an application activation device 10. This application activation device 10 includes an activation event input section (or activation instruction input section) 1 that inputs an activation event (i.e., activation instruction) of a TV application, an activation event detection section (or activation instruction detection section) 2 that detects the activation event input by the activation event input section 1, and an activation preparation state indicating section 3A that indicates, during the time from when an activation event has been detected by the activation event detection section 2 until when the TV application is activated, that the TV application is in preparation for being activated.

In addition, the application activation device 10 also includes an activation event information holding section (or activation instruction information holding section) 4 that holds information on the activation events detected by the activation event detection section 2, an OS boot section 5 that boots an OS of the computer based on the activation events detected by the activation event detection section 2, and an application activation section 6 that activates the TV application based on the event information held in the activation event information holding section 4.

Moreover, the application activation device 10 further includes an interrupt event generation section (or interrupt instruction generation section) 7 that generates an interrupt event (or interrupt event) to an application under execution other than the TV application when an activation event is input by the activation event input section 1 during the execution of the application, so as to permit the TV application to be activated by the application activation section 6, an application execution section 8 that executes the TV application, and an execution state indicating section 3B that indicates the execution or operation state of the TV application at the time of the execution thereof.

As illustrated by the hierarchical or layered configuration in FIG. 2, the application activation device 10 according to this embodiment comprises a TV application layer 11, a middleware layer (remote control manager) 12, a remote control driver layer 13, an OS layer 14, a BIOS layer 15, and a hardware layer 16. Here, note that virtual devices for specifying an interface (I/F) with the middleware layer 12 are implemented onto the BIOS layer 15, and drivers in the form of virtual devices are implemented onto the middleware 12.

As shown in FIG. 3, the display unit, generally designated at reference numeral 20, is provided with, in addition to a power button (not shown) for the PC proper (main body) (e.g., installed at one side of the display), a TV application power button (start button) 1A and a receiver section (or instruction receiving section) 1B of a remote controller (remote control device), both of which are located at appropriate positions of the display, for example, at lower portions of one side of the front face thereof. The TV application power button 1A is provided at its central portion with an LED 3C that is controlled to emit light with its luminescence or light emission mode being changed in accordance with the activation preparation state indicating section 3A and the execution state indicating section 3B, respectively. That is, the activation preparation state indicating section 3A and the execution state indicating section 3B together constitute an indicator section 3 capable of indicating two distinct operating states, so that the single LED 3C can serve to indicate the operating states of these indicating sections 3A and 3B by emitting light in the luminescence or light emitting modes corresponding to the operating states thereof, respectively.

Here, note that the activation event input section 1 is constituted by the TV application power button 1A and the receiver section 1B of the remote controller, and in addition, the activation event detection section 2 detects an activation event by receiving a pressing operation of the TV application power button 1A or an operation of the remote controller. Further, the display unit 20 shown in FIG. 3 is also provided, at locations above the TV application power button 1A, with a Power/Suspend LED 21 for indicating the state of the power supply of the PC main body, an HDD/CD Access LED 22 for indicating the access to a hard disk or a CD, and a Mail LED 23 for indicating the execution of an e-mail application, a NumLock LED 25 and a ScrollLock LED 26.

Next, reference will be made to the operation of the information processing device according to the first embodiment of the present invention while using a flow chart shown in FIGS. 4 and 5. Here, in respective steps shown in these figures, mainly operating sections illustrated in FIG. 2 are indicated where appropriate.

First of all, a series of processes are started from an activation event waiting state (step S1) by turning on the power supply through the power button of the PC main body (step S2), or by turning on the power supply through the TV application power button of the remote controller (step S3), or by turning on the power supply through the TV application power button of the PC main body (step S4). When the power supply is turned on by means of the TV application power button of the remote controller or of the PC main body (i.e., by the turn-on operation of the TV application) (steps S3, S4), activation event information is held or stored (step S5), and the LED 3C is controlled to blink (step S6), so that the state of preparation for activation is indicated, and at the same time the booting/restoration of the OS is performed (step S7). When the restoration of the OS is terminated, the activation event information once held or stored is read in and made effective (step S8).

Then, an event check is made by the activation event information holding section 4 (step S9). When the power supply has been turned on by means of the TV application power button (i.e., an activation event of the TV application has taken place)(step S9, Y), the LED 3C is once turned off (step S12), and thereafter the TV application is activated (step S13), and at the same time the LED 3C is controlled to be turned on (step S14). As a result, the user can watch television by means of the PC.

Here, note that the reason for controlling to once turn off the LED 3C in step S12 is as follows. That is, the application layer calls turn-on control for the LED 3C at the time of activation of the TV application, and turn-off control for the LED 3C at the time of determination thereof. However, when the TV application is uninstalled, or when an activation error occurs for some reason, or when an application is forced to shut down by the OS, there is fear that the resultant state of the LED 3C might vary depending upon the application thus shut down, or an unconsidered or unexpected omission of timing (bug) might occur.

Accordingly, by activating the TV application after the LED 3C is once made to turn off by the driver layer (i.e., the remote control manager immediately before the activation of the TV application, the LED 3C is turned off as its error case. Thus, the user is able to recognize that the television can not be activated any longer. On the other hand, if such a step is not provided, trouble might occur that if the LED 3C continues to blink, the user will not be able to recognize when television is activated.

When the TV application power button is turned off or pressed again (step S15, Y), the TV application is terminated (step S16). Then, the LED 3C is also turned off (step S17), and the booting of the OS is terminated (steps S18 through S21). In this case, the state of the PC is changed to either of the following three states, i.e., the power off state (step S19), the hibernation state (step S20), and the standby state (step S21) depending upon the method of determination.

On the other hand, when the power supply for the PC main body is turned on after step S1 (step S2), the OS is booted or restored at once (step S7), and in the case of the absence of the activation event of the TV application (step S9, N), the ordinary activation of the PC is carried out (step S10). Thereafter, a check on the presence or absence of the activation event of the TV application as well as the power supply turn-off event of the PC main body is carried out (step S11). In the case of the absence of both of the events, the state of the ordinary activation of the PC is maintained until the time when there occurs either of the events (step S11, N), whereas in the case of the presence of the activation event of the TV application, the processing from step S12 onwards as mentioned above is carried out.

On the other hand, in the case of the presence of the power supply turn-off operation of the PC main body in step S11, the control flow proceeds to step S18. In addition, in the case where an AC cable is pulled out or disconnected to stop the supply of power in the power off state of step S19 (step S22), the AC cable is connected again (step S23), and a return to the state of waiting for an activation event in step S1 is carried out after the processes in step S2 through step S18 are once repeated.

Figure 4:
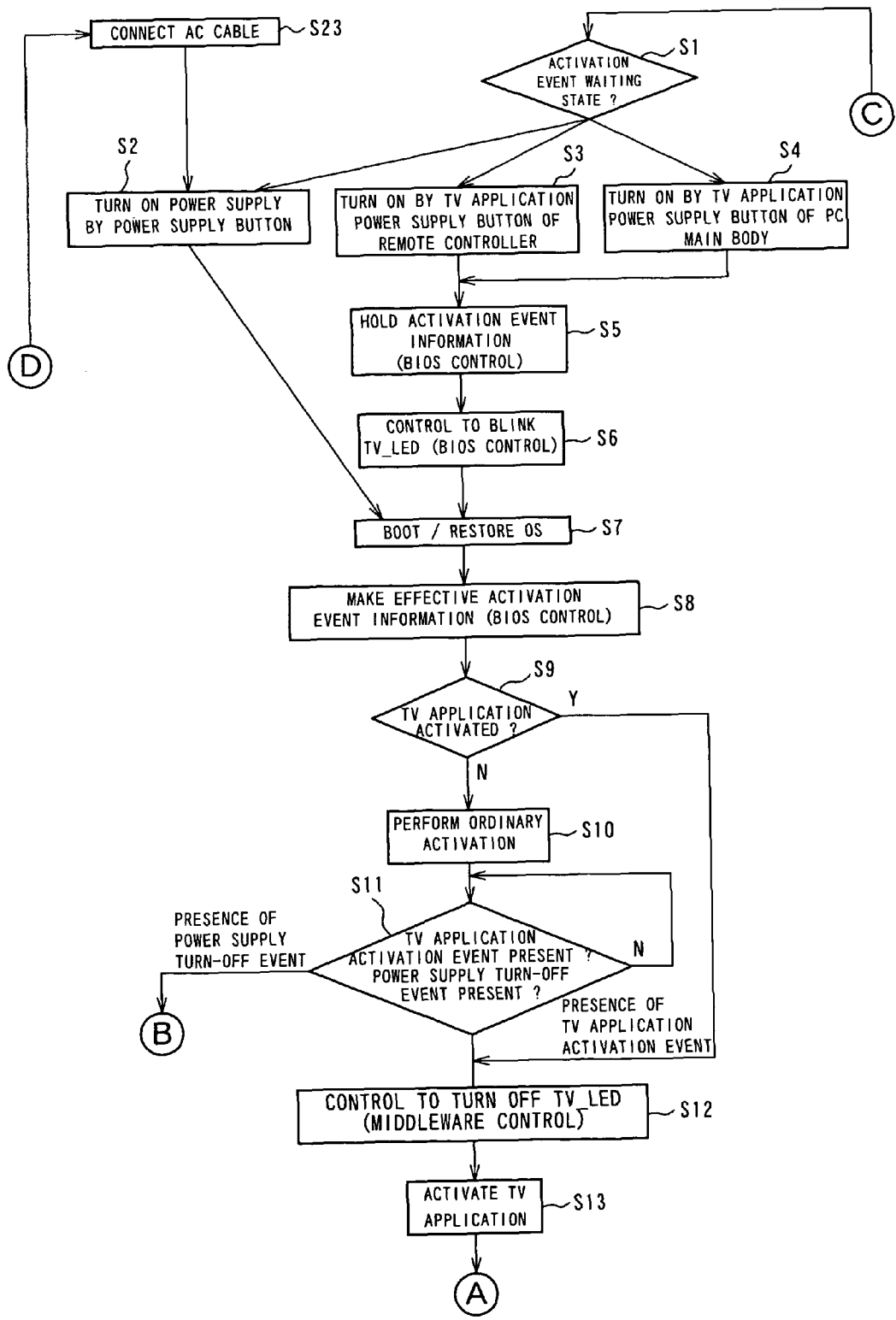
FIG. 4 is the first half of a flow chart showing the operation of the information processing device according to the first embodiment of the present invention.
Figure 5:
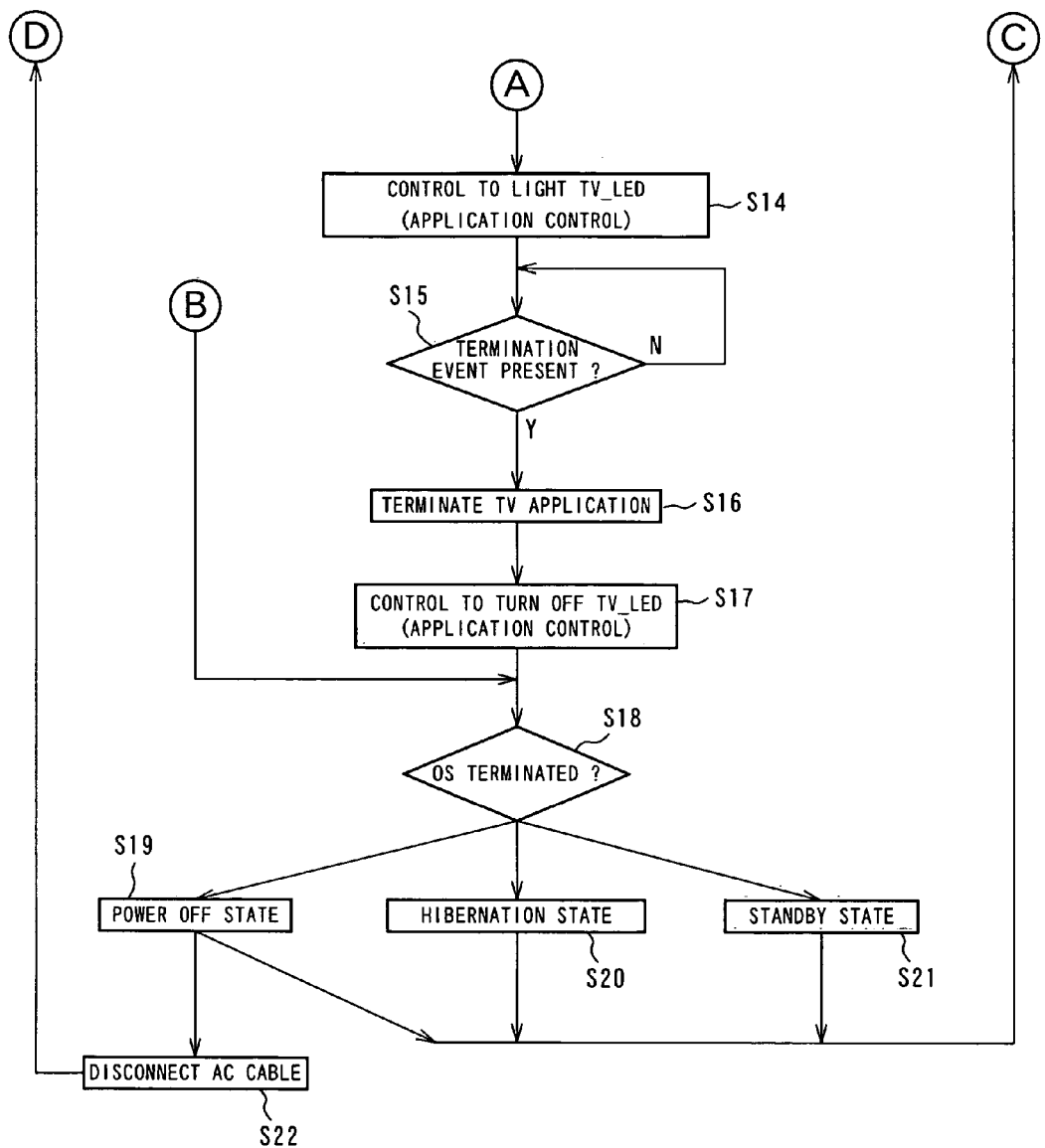
FIG. 5 is the second half of the flow chart showing the operation of the information processing device according to the first embodiment of the present invention.

Here, note that by storing a part of the flow chart shown in FIGS. 4 and 5 as described above in a computer readable recording medium as an application activation program, it is possible to make a computer execute an application activation method in an application activation device according to the present invention.

Embodiment 2

In a second embodiment of the present invention, when the TV application is terminated, the power supply state of the PC main body is returned or restored to its previous state prior to the activation of the TV application.

Figure 6:
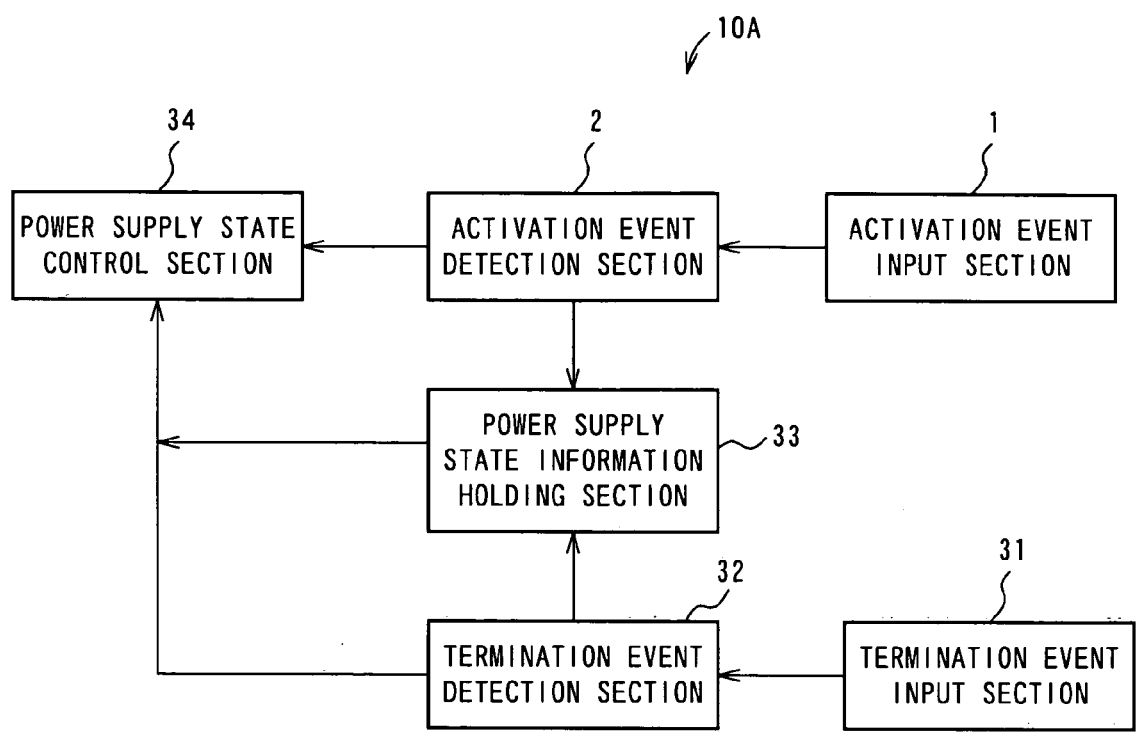
FIG. 6 is a block diagram showing the major parts of an information processing device according to a second embodiment of the present invention.

FIG. 6 is a block diagram that shows an information processing apparatus according to the second embodiment. An application activation device 10A in this information processing device includes, in addition to the configuration as shown in FIG. 1, a power supply state information holding section 33 that holds the power supply state information of the PC main body at a time before the activation of the TV application when an activation event is detected by the activation event detection section 2, a termination event input section 31 that inputs a termination event for terminating the TV application at the time of the execution thereof, a termination event detection section 32 that detects the termination event input by the termination event input section 31, and a power supply control section 34 that shifts the power supply state of the PC to its previous state prior to the activation of the TV application based on the termination event detected by the termination event detection section 32 and the power supply state information held in the power supply state information holding section 33.

Here, note that in the second embodiment, the termination event input section 31 is constituted by an application power supply button arranged on the remote controller or the PC main body, and a termination event is detected by the termination event detection section 32 when the application power supply button is operated again upon execution of the TV application.

FIG. 7 is a flow chart that shows essential portions of the operation of the second embodiment, wherein an operation specific to the second embodiment is performed between step S17 and step S19 as shown in FIG. 5. First of all, similar to the first embodiment, when a termination event is detected (step S15, Y), the LED 3C is controlled to be turned off (step S17), and thereafter the power supply state information held in the power supply state information holding section 33 upon occurrence of an activation event is checked (step S181).

Here, note that in the case of occurrence of an activation event, the holding of the power supply state information by the power supply state information holding section 33 is carried out at the timing when the power supply is turned on upon implementation of a firmware (BIOS) or immediately after restoration from the standby state (i.e., immediately after the power supply is turned on). This can be done in concert with the holding operation of the activating event information in FIG. 4 as explained in the first embodiment (step S5). On the other hand, in the case of the absence of the restoration state, for example when the control process proceeds to step S2 via step S23, it is assumed that an activation event has occurred while the OS is in a booted state, and the power supply state information is checked upon checking in step S181.

As a result, when it is determined in step S182 that the state of the OS prior to the input of the activation event for the TV application has been in a booted state (step S182, Y), the PC is shifted to an OS booting state (step S183). On the other hand, when it is determined that the OS is not in a booted state, a determination is further made as to whether the main body of the PC is in a power off state, a hibernation state, or a standby state (step S184), and a shift is made to the state thus determined based on the determination result (steps S19 through S21).

Although in the above-mentioned preferred embodiments of the present invention, the description has been made with the TV application being taken as the prescribed application, it is needless to say that the present invention is not limited to the use of such a TV application, but is also similarly applicable to other applications such as, for example, visual applications like DVDs, audio applications like CDs, etc.

While the invention has been described in terms of preferred embodiments, those skilled in the art will recognize that the invention can be practiced with modifications within the spirit and scope of the appended claims.

What is claimed is:

1. An information processing device in which a prescribed application operates, said device comprising:
    a display unit having a screen;
    an activation instruction inputting section through which an instruction for activation of said prescribed application is inputted;
    an activation instruction information holding section to hold information on said activation instruction;
    an operating system boot section to boot an operating system based on said activation instruction;
    an application activation section to activate said prescribed application based on information held in said activation instruction information holding section after said operating system is booted;
    a light emitting section arranged on said display unit to indicate a state of said activating; and
    an execution state indicating section that causes said light emitting section to start blinking when said activation instruction is inputted, turns said light emitting section off when said booting of said operating system is completed after said starting of said blinking, and turns said light emitting section on when said activating of said prescribed application is completed after said turning off,
    wherein when said activating of said prescribed application fails after said turning off, said light emitting section continues to be off.

2. The information processing device as set forth in claim 1, further comprising:
    an interrupt instruction generation section to generate an interrupt instruction to an application under execution to activate said prescribed application when an activation instruction is inputted by said activation instruction inputting section during execution of an application other than said prescribed application.

3. The information processing device as set forth in claim 1, wherein
    said activation instruction inputting section is provided with a start button for activation of said prescribed application or an instruction receiving section of a remote control device, and
    said activation instruction is generated by pressing of said start button or by receiving of an instruction from said remote control device.

4. The information processing device as set forth in claim 1, further comprising:
    a power supply state information holding section to hold a power supply state of said information processing device before said activating of said prescribed application; and
    a power supply control section to shift the power supply state of said information processing device to its state before said activating of said prescribed application based on the power supply state of said information processing device held in said power supply state information holding section when termination of execution of said prescribed application is instructed.

5. The information processing device as set forth in claim 4, wherein
said power supply state is one of a power off state, a hibernation state and a standby state.

6. The information processing device as set forth in claim 1, wherein
said prescribed application is an application for displaying received broadcast pictures.

7. An application activation method according to an information processing device which includes a display unit having a screen and in which a prescribed application operates, said method comprising:
detecting when an activation instruction for activation of said prescribed application is inputted to said information processing device;
holding information on said activation instruction detected in said activation instruction detecting;
booting an operating system based on said activation instruction detected in said activation instruction detecting;
activating said prescribed application based on instruction information held in said activation instruction information holding after said operating system is booted;
causing a light emitting section arranged on said display unit and indicating a state of said activating to start blinking when said activation instruction is detected;
turning said light emitting section off when said booting of said operating system is completed after said starting of said blinking; and
turning said light emitting section on when said activating of said prescribed application is completed after said turning off,
wherein when said activating of said prescribed application fails after said turning off, said light emitting section continues to be off.

8. The application activation method as set forth in claim 7, further comprising:
generating an interrupt instruction to an application under execution to activate said prescribed application when an instruction for activation of said prescribed application is inputted during execution of said application other than said prescribed application.

9. The application activation method as set forth in claim 7, further comprising:
holding a power supply state of said information processing device before said activating of said prescribed application; and
shifting the power supply state of said information processing device to its state before said activating of said prescribed application based on the power supply state of said information processing device held in said power supply state information holding when termination of execution of said prescribed application is instructed.

10. The application activation method as set forth in claim 9, wherein
said power supply state is one of a power off state, a hibernation state and a standby state.

11. A computer readable recording medium storing therein an application activation program for making a computer of an information processing device with a display unit having a screen and a hardware indicator execute the steps of:
detecting an activation instruction for activation of a prescribed application inputted to said computer;
holding information on said activation instruction detected in said activation instruction detecting;
booting an operating system based on said activation instruction detected in said activation instruction detecting;
activating said prescribed application based on instruction information held in said activation instruction information holding after said operating system is booted;
causing a light emitting section arranged on said display unit and indicating a state of said activating to start blinking when said activation instruction is detected;
turning said light emitting section off when said booting of said operating system is completed after said starting of said blinking; and
turning said light emitting section on when said activating of said prescribed application is completed after said turning off,
wherein when said activating of said prescribed application fails after said turning off, said light emitting section continues to be off.

12. The computer readable recording medium as set forth in claim 11, wherein said program makes said computer execute:
generating an interrupt instruction to an application under execution thereby to activate said prescribed application when an instruction for activation of said prescribed application is inputted during execution of an application other than said prescribed application.

13. The computer readable recording medium as set forth in claim 11, wherein said program makes said computer execute:
holding a power supply state of said computer before said activating of said prescribed application; and
shifting the power supply state of said computer to its state before said activating of said prescribed application based on the power supply state of said computer held in said power supply state information holding when termination of execution of said prescribed application is instructed.

14. The computer readable medium as set forth in claim 13, wherein
said power supply state is one of a power off state, a hibernation state and a standby state.

15. A display unit for a computer, comprising:
a screen;
a button to activate a prescribed application that operates on an operating system in said computer; and
an indicator indicating a state of said activating of said prescribed application and having a light emitting diode arranged on said display unit, the indicator causing said light emitting diode to start blinking when said button is pressed, turning said light emitting diode off when booting of said operating system is completed after said starting of said blinking, and turning said light emitting diode on when said activating of said prescribed application is completed after said turning off,
wherein when said activating of said prescribed application fails after said turning off, said light emitting diode continues to be off.

* * * * *